(12) United States Patent
Wantling et al.

(10) Patent No.: US 8,968,466 B2
(45) Date of Patent: *Mar. 3, 2015

(54) SIZING AND RHEOLOGY AGENTS FOR GYPSUM STUCCO SYSTEMS FOR WATER RESISTANT PANEL PRODUCTION

(75) Inventors: Steven J. Wantling, Hoover, AL (US); Jason L. Holder, Huntington, TX (US); Harden Christopher Wren, Lufkin, TX (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 308 days.

This patent is subject to a terminal disclaimer.

(21) Appl. No.: 13/214,858

(22) Filed: Aug. 22, 2011

(65) Prior Publication Data

US 2013/0047885 A1    Feb. 28, 2013

(51) Int. Cl.
*C04B 11/00* (2006.01)
*C04B 28/14* (2006.01)
*C04B 24/14* (2006.01)
*C04B 40/00* (2006.01)
*C04B 111/27* (2006.01)

(52) U.S. Cl.
CPC .............. *C04B 28/14* (2013.01); *C04B 24/14* (2013.01); *C04B 40/0039* (2013.01); *C04B 2111/27* (2013.01)
USPC .............................. 106/778; 106/271; 516/31

(58) Field of Classification Search
USPC ...................... 106/778, 271; 516/31
See application file for complete search history.

(56) References Cited

U.S. PATENT DOCUMENTS

| | | | |
|---|---|---|---|
| 2,198,776 A | 4/1940 | King et al. | |
| 2,526,537 A * | 10/1950 | Camp | 106/660 |
| 2,699,414 A | 1/1955 | Selbe | |
| 2,856,304 A * | 10/1958 | Kirk | 428/533 |
| 3,370,957 A | 2/1968 | Royse et al. | |
| 3,869,414 A | 3/1975 | Campbell | |
| 3,891,453 A | 6/1975 | Williams | |
| 3,935,021 A * | 1/1976 | Greve et al. | 524/4 |
| 4,019,920 A | 4/1977 | Burkard et al. | |
| 4,042,409 A | 8/1977 | Terada et al. | |
| 4,094,694 A | 6/1978 | Long | |
| 4,174,230 A | 11/1979 | Hashimoto et al. | |
| 4,239,716 A * | 12/1980 | Ishida et al. | 264/86 |
| 4,328,178 A | 5/1982 | Kossatz | |
| 4,392,896 A | 7/1983 | Sakakibara | |
| 4,421,704 A | 12/1983 | Reily | |
| 4,645,548 A | 2/1987 | Take et al. | |
| 4,647,496 A | 3/1987 | Lehnert et al. | |
| 4,734,163 A | 3/1988 | Eberhardt et al. | |
| 4,741,773 A | 5/1988 | Kuroda et al. | |
| 4,748,196 A | 5/1988 | Kuroda et al. | |
| 5,009,269 A | 4/1991 | Moran et al. | |
| 5,098,943 A | 3/1992 | Tagawa et al. | |
| 5,120,355 A | 6/1992 | Imai | |
| 5,320,677 A | 6/1994 | Baig | |
| 5,395,877 A | 3/1995 | Pucknat et al. | |
| 5,437,722 A * | 8/1995 | Borenstein | 106/778 |
| 5,482,551 A | 1/1996 | Morris et al. | |
| 5,695,553 A | 12/1997 | Claret et al. | |
| 5,851,429 A | 12/1998 | Magyar | |
| 5,922,447 A | 7/1999 | Baig | |
| 5,968,237 A | 10/1999 | Sinnige | |
| 5,980,628 A | 11/1999 | Hjelmeland et al. | |
| 6,010,596 A * | 1/2000 | Song | 162/158 |
| 6,066,201 A | 5/2000 | Wantling | |
| 6,153,040 A | 11/2000 | Rohlf et al. | |
| 6,162,839 A | 12/2000 | Klauck et al. | |
| 6,165,261 A | 12/2000 | Wantling | |
| 6,172,122 B1 | 1/2001 | Lawate et al. | |
| 6,231,656 B1 | 5/2001 | Dekerf et al. | |
| 6,251,979 B1 | 6/2001 | Luongo | |
| 6,287,495 B1 | 9/2001 | Rosthauser | |
| 6,558,685 B1 | 5/2003 | Kober et al. | |
| 6,585,820 B2 | 7/2003 | Wantling | |
| 6,663,707 B2 | 12/2003 | Wantling et al. | |
| 6,673,144 B2 | 1/2004 | Immordino, Jr. et al. | |
| 6,890,976 B2 | 5/2005 | Sinnige | |
| 6,946,504 B2 | 9/2005 | Sinnige | |
| 7,294,189 B2 | 11/2007 | Wantling | |
| 7,374,610 B2 * | 5/2008 | Wantling | 106/271 |
| 7,488,383 B2 | 2/2009 | Donlon et al. | |
| 7,776,928 B2 | 8/2010 | Borsinger et al. | |
| 7,842,731 B2 | 11/2010 | Eckert et al. | |
| 8,580,055 B2 * | 11/2013 | Stuart et al. | 156/39 |

(Continued)

FOREIGN PATENT DOCUMENTS

| | | |
|---|---|---|
| CA | 2116493 | 8/1995 |
| GB | 673892 | 6/1952 |
| JP | 51020217 | 2/1976 |
| JP | 58058304 | 12/1983 |
| JP | 61018705 | 1/1986 |
| WO | WO 99/35103 | 7/1999 |
| WO | WO 00/63294 | * 10/2000 |
| WO | WO 03/004433 | 1/2003 |
| WO | WO 2004/033581 | 4/2004 |

OTHER PUBLICATIONS

PCT/US05/027495 Search Report dated Oct 31, 2005.
PCT/US05/027495 IPER Report dated Mar. 27, 2007.
2437 Montan Wax Substitute, MSDS, The British Wax Refining Co. Ltd, Feb. 18, 2011.
Product Celvol Polyvinyl alcohol, homopolymer, MSDS ID: 80523, Sekisui Specialty Chemicals America, LLC Aug. 6, 2009.

*Primary Examiner* — Paul Marcantoni

(57) ABSTRACT

Emulsions, and processes for making the emulsions, useful for imparting water resistance to gypsum products are disclosed. Process for making the emulsion and gypsum products made from the emulsion are also disclosed. The emulsions of the invention include at least one paraffin wax and a hydrophilic metallic salt. The emulsions of the invention may further include a saponifiable wax substitute for montan wax. The emulsions of the invention may further include a biocide.

15 Claims, No Drawings

(56) References Cited

U.S. PATENT DOCUMENTS

| | | |
|---|---|---|
| 2005/0250858 A1* | 11/2005 | Wantling et al. ............... 516/31 |
| 2006/0009535 A1 | 1/2006 | Wantling |
| 2006/0051619 A1 | 3/2006 | Wantling et al. |
| 2006/0196391 A1 | 9/2006 | Hassan et al. |
| 2007/0245931 A1* | 10/2007 | Wantling .................... 106/778 |
| 2009/0194004 A1 | 8/2009 | Meyer et al. |
| 2010/0116406 A1* | 5/2010 | Mahoney et al. ............... 156/39 |
| 2010/0152347 A1 | 6/2010 | Mahoney et al. |
| 2010/0186870 A1* | 7/2010 | Stuart et al. .................... 156/39 |
| 2011/0100402 A1 | 5/2011 | Soane et al. |
| 2013/0047894 A1* | 2/2013 | Wantling et al. ............. 106/660 |
| 2013/0053481 A1* | 2/2013 | Romero-Nochebuena et al. ......... 524/73 |

* cited by examiner

SIZING AND RHEOLOGY AGENTS FOR GYPSUM STUCCO SYSTEMS FOR WATER RESISTANT PANEL PRODUCTION

FIELD OF THE INVENTION

The present invention relates to wax emulsions useful in imparting water resistance to gypsum products. In addition the present invention relates to methods of preparing the wax emulsions and to articles prepared there-from.

BACKGROUND OF THE INVENTION

Certain properties of gypsum (calcium sulfate dihydrate) make it very popular for use in making industrial and building products; especially gypsum board. It is a plentiful and generally inexpensive raw material which, through a process of dehydration and rehydration, can be cast, molded or otherwise formed to useful shapes. The base material from which gypsum board is manufactured is the hemihydrate form of calcium sulfate (gypsum), commonly termed stucco, which is produced by the heat conversion of the dihydrate from which the water phase has been removed.

The manufacture of gypsum products generally includes preparing a gypsum-containing slurry that contains gypsum and other components of the finished product, and then processing the slurry to remove the water and form and dry the remaining solids into the desired form. In one example of the making of a gypsum board, the gypsum slurry must flow onto a paper substrate. In a continuous process, the slurry/substrate combination is then sized by passing this combination between rollers. Simultaneous with this sizing step, a paper backing is positioned over the sized gypsum slurry. Accordingly, the gypsum slurry must possess sufficient fluidity so that a properly sized gypsum board can be made. Fluidity refers to the ability of the gypsum slurry to flow.

One undesirable trait of gypsum is that gypsum absorbs water, which reduces the strength of the products in which it is used and enables deleterious biological activity, such as the growth of mildew, mold, and other undesirable organism, to occur therein and thereon. Prior art products, like ordinary gypsum board, gypsum tile, gypsum block, gypsum casts, and the like have relatively little resistance to water. When ordinary gypsum board, for example, is immersed in water, the board quickly absorbs a considerable amount of water, and loses a great deal of its strength. Actual tests have demonstrated that when a 2 inch by 4 inch cylinder of gypsum board core material was immersed in water at about 70° F. (21.1° C.), the cylinder showed a water absorption of 36% after immersion for 40 minutes.

Previous attempts to provide water-resistant properties to gypsum board include incorporation of asphalt, metallic soaps, resins, and wax additives into a aqueous gypsum slurry. The resulting materials were difficult to use and the core properties difficult to control. Polysiloxane-based systems have also been used in attempts to impart water-resistance to gypsum board. However, the polysiloxane-based systems are both expensive and difficult to use. Polyvinyl alcohol has been used in an attempt to provide a room temperature system for use in adding water resistant properties to gypsum. However, the polyvinyl alcohol system tends to rapidly separate and thus typically requires continuous mixing prior to use, and there is also the potential for bacterial growth.

A finished gypsum product has also been coated with water resistant films or coatings. One specific example of a past attempt to provide a water-resistant gypsum product is the spraying of a molten paraffin wax or asphalt into an aqueous gypsum slurry. However, these coating applications add additional process complexity and machinery complexity to the manufacturing process as well as extending production times.

Additionally, existing products used to make wax emulsions for gypsum boards are available in less than sufficient amounts. For example, montan wax, made from lignite coal, is an existing product for use in wax emulsions for gypsum. However, montan wax is made only by a few manufacturers, and supplies and deliveries of materials have been observed to be insufficient for modern manufacturing process.

Accordingly, there is a need for a wax emulsion which is useful in imparting water-resistance to gypsum products, and which is economical to apply. There is a need for a alternative components for wax emulsions useful in imparting water-resistance to gypsum products. There also remains a need for an additive which is useful in imparting resistance to biological growth on gypsum products, and which is economical to employ.

SUMMARY OF THE INVENTION

Embodiments of the invention are directed to wax emulsions for providing water-resistance to a gypsum product. The wax emulsions include at least one paraffin wax and a hydrophilic metallic salt.

In one aspect of the invention, an emulsion is provided for providing water-resistance to a gypsum product, including at least one paraffin wax, wherein each paraffin wax of the at least one paraffin wax, comprises a melting point from about 57° C. and about 66° C., an oil content from about 0.1% to less than 1% by weight of the wax, a flash point from about 200° C. to about 240° C., and an average carbon number of the paraffin from 29 to 32, a hydrophilic metallic salt, and water. In another aspect of the invention, the invention includes gypsum products prepared utilizing the emulsion of the invention.

In another aspect of the invention, a method is provided for making the emulsion for providing water-resistance to a gypsum product, including providing a first mixture comprising at least one paraffin wax and a saponifiable wax, wherein each paraffin wax of the at least one paraffin wax comprises a melting point between about 57° C. and about 66° C., an oil content from about 0.1% to less than 1% by weight of the wax, a flash point from about 200° C. to about 240° C., and an average carbon number of the paraffin from 29 to 32, and wherein the saponifiable wax comprises a solidification temperature from about 60° C. to about 90° C., a saponification value from about 30 to about 120, and an acid value from about 10 to about 40, providing a second mixture comprising a hydrophilic metallic salt and water, combining the first mixture and the second mixture to form a resultant mixture, and homogenizing the resultant mixture.

In another aspect of the invention, an emulsion is provided for providing water-resistance to a gypsum product, including at least one paraffin wax, wherein each paraffin wax of the at least one paraffin wax, comprises a melting point from about 57° C. and about 66° C., an oil content from about 0.1% to less than 1% by weight of the wax, a flash point from about 200° C. to about 240° C., and an average carbon number of the paraffin from 29 to 32, a saponifiable wax, wherein the saponifiable wax comprises a solidification temperature from about 60° C. to about 90° C., a saponification value from about 30 to about 120, and an acid value from about 10 to about 40, a hydrophilic metallic salt, and water. In another aspect of the invention, the invention includes gypsum products prepared utilizing the emulsion of the invention.

In another aspect of the invention, a method is provided for making the emulsion for providing water-resistance to a gypsum product, including providing a first mixture comprising at least one paraffin wax and a saponifiable wax, wherein each paraffin wax of the at least one paraffin wax comprises a melting point between about 57° C. and about 66° C., an oil content from about 0.1% to less than 1% by weight of the wax, a flash point from about 200° C. to about 240° C., and an average carbon number of the to paraffin from 29 to 32, and wherein the saponifiable wax comprises a solidification temperature from about 60° C. to about 90° C., a saponification value from about 30 to about 120, and an acid value from about 10 to about 40, providing a second mixture comprising a hydrophilic metallic salt and water, combining the first mixture and the second mixture to form a resultant mixture, and homogenizing the resultant mixture.

DETAILED DESCRIPTION OF THE INVENTION

The present invention provides wax emulsions that are useful in imparting water-resistance properties to gypsum products. In addition, the wax emulsions may be used in the manufacture of additional products, such as gypsum products having wood fiber or other lignocellulosic materials. The wax emulsions include at least one paraffin wax and a hydrophilic metallic salt. The wax emulsion may be free of an alkyl phenol, free of a starch component, or both. The wax emulsions of the present invention may be added to mixtures of gypsum and water without adversely affecting properties of the mixture which are necessary to the manufacture of gypsum products such as gypsum board.

Waxes useful in the emulsions of the invention include paraffin waxes having desired physical properties. The paraffin waxes may have a melting point from about 57° C. (135° F.) to about 66° C. (151° F.). The paraffin waxes may have an minimum flash point of 200° C. or greater, such as from about 200° C. (392° F.) to about 245° C. (473° F.), such as from about 204° C. (399° F.) to about 243° C. (470° F.). Also, the oil content of the paraffin waxes may be less than about 1% by weight, such as from about 0.1% to less than 1 wt %, for example from about 0.4 wt % to less than about 0.7% by weight. The paraffin waxes may have an average chain length of about 29 to 32 carbon atoms ($C_{29}$-$C_{32}$). The paraffin waxes are typically of low volatility, exhibiting less than about a 10% loss in weight during standard thermogravimetric analysis. The paraffin waxes may be non-saponifiable waxes.

Examples, of suitable paraffin waxes include a wax selected from the group of Exxon Parvan 1370, Exxon Parvan 1380, Exxon Parvan 1420, Exxon Parvan 1451, IGI 1301A, IGI 1302A, IGI 1304A, Nippon Serio 145, and combinations thereof. Exxon Parvan 1370, Exxon Parvan 1380, Exxon Parvan 1420, Exxon Parvan 1451 are commercially available from Exxon-Mobil, Inc., of Bayton, Tex. IGI 1301A, IGI 1302A, and IGI 1304A, are commercially available from International Group Incorporated, of Farmers Valley, Pa. Nippon Serio 145 is commercially available from Nippon Serio, of Tokuyama, Japan. Sample properties for the suitable paraffin wax examples are shown in Table 1 below.

TABLE 1

| Waxes | Melt Temp ° C. (° F.) | Oil Content | Flash Temp ° C. (° F.) | Average Carbon number Total Paraffins |
|---|---|---|---|---|
| Exxon Parvan 1370 | 57.0° C. (135° F.) | 0.1% to 0.7% | >204° C. (400° F.) | 29 |
| Exxon Parvan 1380 | 57.8° C. (136° F.) | 0.1% to 0.6% | >204° C. (400° F.) | 29 |
| Exxon Parvan 1420 | 60.0° C. (140° F.) | 0.1% to 0.6% | >210° C. (410° F.) | 31 |
| Exxon Parvan 1451 | 61.1° C. (142° F.) | 0.1% to 0.5% | >210° C. (410° F.) | 31 |
| IGI 1301A | 61.7° C. (143° F.) | 0.1% to 0.5% | >243° C. (470) | 30/32 |
| IGI 1302A | 60.0° C. (140° F.) | 0.1% to 0.5% | >238° C. (460° F.) | 30/32 |
| IGI 1304A | 65.6° C. (150° F.) | 0.1% to 0.7% | >236° C. (460° F.) | 30/32 |
| Nippon Serio 145 | 61.3° C. (143° F.) | 0.1% to 0.4% | >238° C. (460° F.) | 31 |

In certain embodiments, it is useful to saponify one or more of waxes for use in the emulsion. In this way, a saponified wax functions as an added surfactant or dispersant.

In one embodiment, a saponifiable wax is added the emulsion. Saponifiable waxes useful in this respect are limited to waxes having an acid value or a saponification value and a melting point greater than about 180° F. (82.2° C.). Waxes which may be saponified in the emulsions of the present invention include montan wax, carnauba wax, beeswax, bayberry-myrtle wax, candelilla wax, caranday wax, castor bean wax, esparto grass wax, Japan wax, ouricury wax, retamoceri mimibi wax, shellac, spermaceti wax, sugar cane wax, wool-lanolin wax, and combinations thereof, among others. Montan wax is made from lignite or brown coal.

Saponification of such waxes may be accomplished by combining the wax with a strongly basic material such as an alkali metal hydroxide or other hydroxide. Examples of such hydroxides include sodium hydroxide, potassium hydroxide, ammonium hydroxide, and combinations thereof. The amount of strongly basic material needed to saponify a wax may be calculated based on the saponification value of the wax. For example, the saponification value divided by 1000 equals the grams of potassium hydroxide to add per gram of wax.

Alternatively, a saponifiable wax substitute for montan wax (also referred to as a montan wax substitute) may be used for the saponifiable wax. The saponifiable wax substitute for montan wax may comprise a petroleum derived wax base material, such as paraffin wax, microcrystalline wax, or both. The saponifiable wax substitute for montan wax may further include one or more organically derived waxes, a carboxylic acid, other organic components, such as triglycerides and ketones, among others. For example, the saponifiable wax substitute for montan wax may comprise a microcrystalline wax derived from petroleum, a carnuba wax, and stearic acid. The saponifiable wax substitute for montan wax may be free of a montan wax. The emulsion may be free of a montan wax. In one embodiment, a montan substitute wax and a montan wax and/or other saponifiable wax as described herein may be used in combination for the emulsion. In such an embodiment, the montan wax and/or other saponifiable wax as described herein may be used in an amount comprising about 5% or less, such as from 0.1% to 5%, by weight of the emulsion.

The saponifiable wax substitutes for montan wax may have a saponification value from about 30 to about 120, such as from about 45 to about 105. The saponifiable wax substitutes for montan wax may have an acid number of from about 10 to about 40, such as from about 12 to about 36. Suitable saponifiable wax substitutes for montan wax include waxes having a combined acid number and saponification value in the combined range from about 40 to about 160, such as from about 50 to about 140, for example, from about 55 to about 120. The saponifiable wax substitutes for montan wax may have a solidification temperature from about 60° C. to about 90° C., such as from about 65° C. to about 85° C.

Examples of suitable saponifiable wax substitutes for montan wax include British Montan 2432, British Montan 2437, British Montan 2438, and combinations thereof. British Montan 2432, British Montan 2437, and British Montan 2438, are commercially available from The British Wax Refining Co., Ltd., of The United Kingdom. The properties for the above waxes are shown in Table 2 below. Other waxes believed to be suitable for use in the emulsion include British Montan 2431 and British Montan 2436, and which waxes may be used in combination or as substitutes for the British Montan 2432, British Montan 2437 and British Montan 2438 described herein. British Montan 2431 and British Montan 2436 are commercially available from The British Wax Refining Co., Ltd., of The United Kingdom.

TABLE 2

| Waxes | Solidification Temp ° C. ASTM D938 | Acid Value ASTM D1386 | Saponification Value ASTM D1387 |
|---|---|---|---|
| British Montan 2432 | 65-72° C. | 12-25 | 45-60 |
| British Montan 2437 | 78-84° C. | 15-35 | 80-105 |
| British Montan 2438 | 78-84° C. | 15-35 | 80-105 |
| British Montan 2431 | 75-80° C. | 22-36 | 75-100 |
| British Montan 2436 | 78-84° C. | 15-25 | 80-105 |

Typical composition ranges for the emulsion of the invention useful in providing water-resistance to a gypsum product include any combination of the following. The at least one paraffin wax may be present in the emulsion in an amount of about 25% to about 40% by weight based on the total weight of the emulsion. A saponifiable wax may be present in an amount of about 2.5% to about 4.5% by weight based on the total weight of the emulsion. Water may be present in an amount of about 55% to about 65% by weight based on the total weight of the emulsion to form the emulsion.

The emulsions may also include a hydrophilic metallic salt, such as magnesium sulfate ($MgSO_4$). Suitable hydrophilic metallic salts include magnesium sulfate, potassium sulfate, lithium sulfate, ammonium sulfate, potassium acetate, ammonium heptamolybdate, and combinations thereof. The hydrophilic metallic salt, such as magnesium sulfate ($MgSO_4$), may be present in the emulsion in an amount of about 0.05% to about 5% by weight, such as about 0.05% to about 3.0%, for example, from about 0.1% to about 2.5%, and in a further example, between about 0.1% to about 1.0%, based on the total weight of the emulsion.

It is believed that the hydrophilic metallic salt eliminates the use of starch as a suspension/gelation aid, and to be compatible with a wider range of available waxes (i.e. lower cost/lower melt point waxes). Examples of the starches utilized as a suspension/gelation aid are described in US Patent Application Publication No. 2005/0250858 A1 and in U.S. Pat. No. 6,663,707, both of which are incorporated herein by reference. Thus, the emulsion may be free of a starch component.

Additionally, hydrophilic metallic salts, such as $MgSO_4$, are believed to be water soluble and offer an opportunity to disperse wax, suspended as an emulsion, more uniformly through a stucco/core substrate, and to be compatible with a wider range and lower cost/lower melt point of available waxes. The $MgSO_4$ containing emulsion of the present invention also allows a reduction in the use of the alkylated phenol, which functioned as a dispersant in the historic system. As a result the wax emulsion of the present invention is significantly more stable than former or competitive systems and may be stored at higher solids content, with out comprising the performance or stability of the emulsion. The emulsion may be free of alkyl phenols. As used herein, "alkyl phenols" refer to phenolic compounds having a long chain alkyl group.

Additional components including an ionic dispersant, an alkali metal hydroxide, and combinations thereof, may also be used with the waxes in the emulsions described herein.

The ionic dispersant may include cationic materials, such as cationic surfactants. The ionic dispersant may include a compound selected from the group of polynaphthalenesulfonic acid, a lignosulfonate, and combinations thereof. The ionic dispersant may be used in an amount of about 0.25% to about 5.0% by weight based on the total weight of the emulsion. An example of a polynaphthalenesulfonic acid ionic dispersant is DISAL™ surfactant from Handy Chemicals Limited Corporation of Canada. An example of a lignosulfonate ionic dispersant is POLYFON™ H surfactant commercially available from MeadWestvaco Corporation of Richmond, Va.

In embodiments of the emulsion utilizing a saponifiable wax substitute for montan wax, the ionic dispersants may be selected from the group of a polynaphthalenesulfonic acid, a lignosulfonate, a polynaphthalene sulfonate calcium salt, and combinations thereof. The ionic dispersants may be used in an amount of about 0.25% to about 5.0% by weight based on the total weight of the emulsion. In one embodiment, the ionic dispersant comprises a mixture of a polynaphthalenesulfonic acid, a lignosulfonate, and polynaphthalene sulfonate calcium salt, and the ionic dispersant mixture comprises from about 0.25% to about 5.0% by weight based on the total weight of the emulsion. Examples of polynaphthalene sulfonate calcium salt ionic dispersants are Durasar surfactant and Gypsperse surfactant from Handy Chemicals Limited Corporation of Canada.

The alkali metal hydroxide may be used in an amount or about 0.2% to about 1.5% by weight based on the total weight of the emulsion. The alkali metal hydroxide may be added in an aqueous solution, for example about 45 wt % potassium hydroxide solution. The alkali metal hydroxide may be selected from the group consisting of potassium hydroxide, sodium hydroxide, and combinations thereof. Additionally, ammonium hydroxide may be used separately, or in combination with the alkali metal hydroxide, in the emulsion.

An optional component for the emulsions or gypsum formulations described herein includes a biocide, which may also be referred to as a preservative. The biocides disclosed herein are useful for inhibiting biological growth, for example, the growth of mildew, fungi, bacteria, algae, and other microorganisms, on gypsum products. As used herein biocides includes such compounds as bactericides, fungicides, algaecides, mildewcides, or a combination thereof.

The biocide may be chosen according to (1) the target organism; (2) solubility characteristics; (3) stability to the temperature and pH; and other conditions found in the manufacture of the gypsum product. Biocides include substances that kill or inhibit the growth of microorganisms such as molds, mildew, slimes, fungi, bacteria, etc. Fungicides include substances that kill or inhibit the growth of fungi.

More specific examples of biocides include, but are not limited to, chlorinated hydrocarbons, organometallics, halogen-releasing compounds, metallic salts, organic sulfur compounds, and phenolics. Preferred biocides have the general structure of a heterocycle containing nitrogen and sulfur, for example, thiabendazole[2-(4-thiazolyl)-1H-benzimidazole].

Exemplary biocides (preservatives) include the compositions disclosed in U.S. Pat. No. 3,370,957 to Wagner et al., and U.S. Pat. No. 7,294,189 to Wantling which are incorporated in their entirety herein, and which discloses biocides according to the general structure (I):

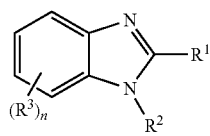

(I)

wherein $R^1$ can be a heterocycle containing nitrogen and sulfur, such as thiazolyl, isothiazolyl, or thiadiazolyl, which can optionally be substituted with $C_1$-$C_6$ alkyl; $R^2$ can be hydrogen or $C_1$-$C_6$ alkyl, specifically hydrogen; n is 0, 1, 2, or 3; each instance of $R^3$ can independently be hydrogen, $C_1$-$C_6$ alkyl, phenoxy, $C_1$-$C_6$ alkoxy, halo, amino, $C_1$-$C_6$ alkylamino, di $C_1$-$C_6$ alkyl amino, imidazolyl, thiazolyl, isothiazolyl, thiadiazolyl, thienyl, furyl, naphthyl, phenyl, halophenyl, $C_1$-$C_6$ alkyl phenyl, $C_1$-$C_6$ alkoxyphenyl, and the like.

Particular embodiments of the mildewcide include those according to the general structures (II) and (III):

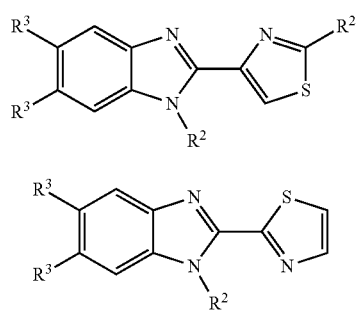

wherein $R^1$, $R^2$, and $R^3$ are as defined previously.

Exemplary mildewcides according to structure (I) include: 2-(4'-thiazolyl)benzimidazole; 2-[3'-(1',2',5'-thiadiazolyl] benzimidazole; 2-(4'-thiazolyl)-5-methoxy benzimidazole; 2-(4'-thiazolyl)-5-phenoxy benzimidazole hydrochloride; 2-(2'-methyl-4'-thiazolyl)benzimidazole; 2-[4'-(1',2',3'-thiadiazolyl)]benzimidazole; 1-acetyl-2-(4'-thiazolyl)-5-phenyl benzimidazole; 2-(4'-isothiazolyl)benzimidazole; 2-(4'-thiazolyl)-6-fluoro benzimidazole; 2-(4'-thiazolyl)-5-amino benzimidazole; 2-(2'-thiazolyl)-5-(1'-imidazolyl)benzimidazole; 2-(4'-isothiazolyl)-5-chlorobenzimidazole; 2-(4'-thiazolyl)-5-phenyl benzimidazole; 2-[4'-(1',2',3'-thiadazolyl)]-5-(4'-tolyl)benzimidazole; 1-acetyl-2-(2'-thiazolyl)-5-phenyl benzimidazole; 1-methyl-2-(2'-isothiazolyl)-5-(2'-methoxyphenyl) benzimidazole; 2-(4'-isothiazolyl)-5-furyl benzimidazole; 2-(4'-thiazolyl)-5-(4'-fluorophenyl)benzimidazole hydrochloride; 2-(4'-thiazolyl)-5-bromo benzimidazole; 2-(4'-thiazolyl)-5-chloro benzimidazole; 2-(2'-thiazolyl)-5-methoxy benzimidazole; 2-(4'-thiazolyl)-5-(2'-fluorophenyl)benzimidazole hydrochloride; 2-[3'-(1',2',5'-thiadiazolyl) 1-5-methylthio benzimidazole; 2-(4'-thiazolyl)-5,6-difluoro benzimidazole; 1-benzoyl-2-(4'-thiazolyl)benzimidazole; 2-(2'-thiazolyl)-5-(2'-pyrryl)benzimidazole; 1-methyl-2-(4'-isothiazolyl) benzimidazole hydrochloride; 2-(4'-thiazolyl)-5-phenoxy benzimidazole; 2-[3'-(1',2',5'-thiadiazolyl)1-5-methoxy benzimidazole; 1-ethyl-2-(4'-thiazolyl)-5-(2'-thiazolyl)benzimidazole; 1-acetyl-2-[3'-(1',2',5'-thiadiazolyl)]-5-(2''-furyl) benzimidazole; 2-(4'-thiazolyl)-4-fluoro benzimidazole hydrochloride; 2-(2'-thiazolyl)benzimidazole; 1-acetyl-2-(4'-thiazolye benzimidazole; and combinations thereof. In a particular embodiment described below, thiabendazole (2-(4'-thiazolyl)benzimidazole) has been found to be effective in inhibiting the growth of biological agents on gypsum board, thus indicating the advantageous utility of benzimidole compounds generally and the other biocides indicated herein.

In one embodiment, the biocide is added as the last ingredient in the wax emulsion, for example, the biocide is added to the already-formed wax emulsion. The biocide may be present in the wax emulsion in an amount of 0.01 to 10% by weight of the wax emulsion (wt. %), optionally 0.1 to 5 wt. %, for example, 0.2 to 4 wt. %. The biocide may be added in any convenient form, including 100% solids, as a hydrated paste or in a water diluted system, for example, 25-50% active thiabendazole. The biocide is preferably added with agitation, which is believed to thoroughly disperse the biocide into the discontinuous wax phase of the emulsion. Optionally, one or more of the biocides may employed in an amount calculated to be about 0.0025% to about 0.2% by weight of the finished gypsum product. The biocide is post-added to the wax emulsion under severe agitation to any desired wax emulsion where the water phase is the continuous phase in amounts ranging from 0.01 to 5% (percent) by volume.

The wax emulsions of the present invention have been observed to have desirable properties. The emulsions of the present invention have been observed to stable for at least one (1) week, such as for at least one (1) month, and for example, for at least 6 months. The wax emulsion formed herein also exhibited the properties as follows. The wax emulsions have a pH of less than 12, such as from about 10.5 to about 12, for example, from about 10.9 to about 11.1. The wax emulsions may have a viscosity from about 1 cps to about 30 cps, such as from about 2 cps to about 14 cps.

Additionally, the typical mean solids content of the emulsions of the invention have been observed to be at least 30% by weight, preferably at least 40% by weight, more preferably at least 50%, and even more preferably at least 60% by weight. In one embodiment, the solids may be present from about 33% to about 42% by weight of the emulsion. Stability of the higher solids content emulsions are beneficial in the potential to reduce transportation costs.

The resulting wax emulsion can be used in the preparation of gypsum products and does not have significant affect on the desired properties of the finished products, such properties including strength, facing bonds, and water resistance where applicable. Various sources of gypsum may be used in the compositions of the present invention. However, the amount of water required to hydrate a gypsum sample will vary with the purity of the sample. The wax emulsions may be added to mixtures of gypsum and water without adversely affecting properties of the mixture which are necessary to the manufacture of gypsum products such as gypsum board and GWF. Such properties include fluidity, formability and set time. In the manufacture of gypsum wallboard products it is important to impart water resistance to the finished product, so as to limit the maximum water absorption realized by the wallboard in a defined board soak test. For example, American Standards for Testing Materials ASTM 1396 and sub parts thereof describe such a test.

The wax emulsions produced gypsum materials having a water absorption from about 0.1% to about 3%, such as from about 0.15% to about 2.8%. The wax emulsions produced gypsum materials having a fluidity/rheology from about 2.75 inches in patty diameter to about 3.5 inches in patty diameter, such as from about 2.9 inches in patty diameter to about 3.4 inches in patty diameter under the test as described herein.

In the manufacture of conventional gypsum board, the wax emulsion enters the process and is introduced into the stucco (gypsum) slurry at a mixer just prior to being released into a forming station for the board. In the case of gypsum wood fiber process, the emulsion is introduced into the fourdiner section of a paper machine. In one embodiment, the emulsion comprises from about 1 wt % to about 7 wt. %, such as from about 1.5 wt % to about 3 wt. %, of the combined emulsion and gypsum composition. In another embodiment, the emulsion is added in sufficient quantity to provide from 1 wt. % to about 5 wt. %, such as from about 1.5 wt % to about 3 wt. %, of wax solids into the gypsum and emulsion composition.

The gypsum board may comprise at least gypsum, the at least one paraffin wax, the saponifiable wax, and the hydrophilic metallic salt as described above, and optionally water. The gypsum may further include additional materials, such as lignocellulosic materials, such as wood or wood fibers. The gypsum board may further include any additional emulsion components described herein, such as the biocide described herein.

The wax emulsions containing the components described herein may also be added to the resin used in making various kinds of panel boards that do not contain gypsum. For example, emulsions described herein are useful in improving the water resistance of lignocellulosic products, thus ameliorating the detrimental effects that absorbed water can have on such products, including dimensional instability (swelling) and biological degradation as described in the process and materials of U.S. Pat. No. 7,807,735, which is incorporated herein in its entirety.

In order to provide a better understanding of the present invention including representative advantages thereof, the following examples are offered.

EXAMPLES

Table 1 herein lists the components and certain characteristics of the emulsion formulations utilized in the examples. Examples of wax emulsions and gypsum formulations formed from the component described herein are shown in Table 3-1 and Table 3-2.

In the preparation of the emulsions, the water and water soluble components were combined in a first mixture then heated to a temperature of between about 185° F. (85° C.) to about 205° F. (96.1° C.). The wax compounds were incorporated in a second mixture and also heated to a temperature of between about 185° F. (85° C.) to about 205° F. (96.1° C.). The aqueous and wax mixtures where then combined and the resultant mixture was then placed in a homogenizer. With homogenization it is preferred that a distribution of micelle diameters ranging from about 0.8 microns to about 1.8 microns be achieved. However, the distribution of micelle diameters may range from about 0.5 microns to about 3 microns. This level of homogenization may be attained, for example, by using a dual orifice homogenizer operating at from about 2,000 to about 4,000 psig.

TABLE 3-1[1]

| Component | 1 | 2 | 3 | 4 | 5 | 6 | 7 | 8 |
|---|---|---|---|---|---|---|---|---|
| Exxon Parvan 1370 | 33.5 | — | — | — | — | — | — | — |
| Exxon Parvan 1380 | — | 33.5 | — | — | — | — | — | — |
| Exxon Parvan 1420 | — | — | 33.5 | — | — | — | — | — |
| Exxon Parvan 1451 | — | — | — | 33.5 | — | — | — | — |
| IGI 1301A | — | — | — | — | 33.5 | — | — | — |
| IGI 1302A | — | — | — | — | — | 33.5 | — | — |
| IGI 1304A | — | — | — | — | — | — | 33.5 | — |
| Nippon Serio 145 | — | — | — | — | — | — | — | 33.5 |
| Montan | 3.5 | 3.5 | 3.5 | 3.5 | 3.5 | 3.5 | 3.5 | 3.5 |
| $MgSO_4$ | 0.5 | 0.5 | 0.5 | 0.5 | 0.5 | 0.5 | 0.5 | 0.5 |
| DISAL[2] | 0.5 | 0.5 | 0.5 | 0.5 | 0.5 | 0.5 | 0.5 | 0.5 |
| Polyfon H[3] | 0.5 | 0.5 | 0.5 | 0.5 | 0.5 | 0.5 | 0.5 | 0.5 |
| 45% aq. KOH | 0.75 | 0.75 | 0.75 | 0.75 | 0.75 | 0.75 | 0.75 | 0.75 |
| Water | 60.75 | 60.75 | 60.75 | 60.75 | 60.75 | 60.75 | 60.75 | 60.75 |
| Total | 100.00 | 100.00 | 100.00 | 100.00 | 100.00 | 100.00 | 100.00 | 100.00 |
| Emulsion Properties | | | | | | | | |
| pH | 10.99 | 11.01 | 10.95 | 11.02 | 11.01 | 10.92 | 10.96 | 10.99 |
| Solids | 37.78 | 38.7 | 33.63 | 41.06 | 38.28 | 33.82 | 34.69 | 38.42 |
| Viscosity Cps | 8 | 5.7 | 2.8 | 9.8 | 13.3 | 3.2 | 4.7 | 7.8 |
| Results of Gypsum Formulations | | | | | | | | |
| Patty diameter (inches) | 2.95 | 3.08 | 3.33 | 3.16 | 2.94 | 3.29 | 3.18 | 3.24 |

TABLE 3-1[1]-continued

| Component | 1 | 2 | 3 | 4 | 5 | 6 | 7 | 8 |
|---|---|---|---|---|---|---|---|---|
| Water Absorption | 0.87 | 0.19 | 0.74 | 0.88 | 2.79 | 1.02 | 1.5 | 1.96 |

[1] All component and solid values are % by wt.
[2] DISAL ™ is a polynaphthalenesulfonic acid dispersant available from Handy Chemical, Montreal, Quebec, Canada.
[3] POLYFON ™ H is a lignosulfonate dispersant available from MeadWestvaco Corporation, Stamford, Connecticut Table 3-1 includes fluidity and absorption data obtained for test specimens prepared utilizing the emulsions. All gypsum formulation test specimens were made by mixing 50 grams of stucco (the hemihydrate form of calcium sulfate) with water and the emulsion together and allowed to stand for one minute. The mixing amounts for the above emulsions are shown in Table 3-2 below.

TABLE 3-2

| Emulsion | Stucco (grams) | Water Amount (grams) | Emulsion Amount (grams) |
|---|---|---|---|
| 1 | 50 | 32.5 | 4 |
| 2 | 50 | 32.6 | 3.9 |
| 3 | 50 | 32 | 4.45 |
| 4 | 50 | 32.85 | 3.65 |
| 5 | 50 | 32.6 | 3.9 |
| 6 | 50 | 32.1 | 4.45 |
| 7 | 50 | 32.2 | 4.33 |
| 8 | 50 | 32.6 | 3.9 |

This mixture was then mixed for an additional 30 seconds. After this second mixing, the specimens were poured out onto a flat surface and the diameter of the resulting patty was measured. The diameter of a patty is an index of the fluidity of the specimen. The larger the diameter, the more fluid the specimen. Patties made in the fluidity test were dried for at least 24 hours at 110° F. (43.3° C.). At the end of this time, the patties were weighed and the weight was recorded.

The dried patties were then immersed in water for two hours. At the end of the two hour immersion, the patties were weighed and this wet weight was recorded. The percent water retention was then calculated based on the difference between these two recorded weights.

While not being held to any particular theory, it is believed that the oil content relates to effectiveness of the formation of the emulsion and the resulting gypsum formulations. High oil contents, i.e., greater than 2% detrimentally affect the performance and physical properties of those waxes used to form emulsions. Additionally, waxes without oil content are also believed to detrimentally affect the performance and physical properties of those waxes used to form emulsions.

In contrast, waxes not suitable for use in gypsum wax formulations were also observed. The not suitable wax (ineffective formulations) emulsions were prepared and tested as described above for the Table 3-1 emulsions and with the components and results listed in the following Tables 4 and 5.

TABLE 4

| Waxes | Melt Temp ° C. (° F.) | Oil Content (wt. %) | Flash Temp ° C. (° F.) | Average Carbon number Total Paraffins |
|---|---|---|---|---|
| Sunwax 20 | 40-55° C. (104-131° F.) | 15-20% | >204° C. (399° F.) | 22-26 |
| Exxon Prowax 561 | 64.0° C. (147° F.) | 15-20% | >232° C. (450° F.) | 32 |
| Exxon Parvan 1380 | 57° C. (135° F.) | 15-20% | >280° C. (425° F.) | 28 |
| Exxon Prowax 390 | 68° C. (154.4° F.) | 3-5.0% | >232° C. (450° F.) | 22/24 |
| Alpha-Olefin 30+ | 72.2° C. (162° F.) | 0 | >252° C. (485° F.) | 30 |
| Alpha-Olefin 30+ | 67.8° C. (154° F.) | 0 | >222° C. (432) | 30 |
| Alpha-Olefin 30+ | 35.6° C. (96° F.) | 0 | >183° C. >(362° F.) | 20-24 |
| Alpha-Olefin 30+ | 66.1° C. (151° F.) | 0 | >218° C. (425° F.) | 24-28 |

TABLE 5[1]

| Component | 1 | 2 | 3 | 4 | 5 | 6 | 7 | 8 |
|---|---|---|---|---|---|---|---|---|
| Sunwax 20 | 33.5 | — | — | — | — | — | — | — |
| Exxon Prowax 561 | — | 33.5 | — | — | — | — | — | — |
| S-Wax | — | — | 33.5 | — | — | — | — | — |
| Exxon Prowax 390 | — | — | — | 33.5 | — | — | — | — |
| Alpha-Olefin C30 | — | — | — | — | 33.5 | — | — | — |
| Alpha-Olefin C30HA | — | — | — | — | — | 33.5 | — | — |
| Alpha-Olefin C20-24 | — | — | — | — | — | — | 33.5 | — |
| Alpha-Olefin C24-28 | — | — | — | — | — | — | — | 33.5 |
| Montan | 3.5 | 3.5 | 3.5 | 3.5 | 3.5 | 3.5 | 3.5 | 3.5 |
| $MgSO_4$ | 0.5 | 0.5 | 0.5 | 0.5 | 0.5 | 0.5 | 0.5 | 0.5 |
| DISAL[2] | 0.5 | 0.5 | 0.5 | 0.5 | 0.5 | 0.5 | 0.5 | 0.5 |
| Polyfon H[3] | 0.5 | 0.5 | 0.5 | 0.5 | 0.5 | 0.5 | 0.5 | 0.5 |

TABLE 5[1]-continued

| Component | 1 | 2 | 3 | 4 | 5 | 6 | 7 | 8 |
|---|---|---|---|---|---|---|---|---|
| 45% aq. KOH | 0.75 | 0.75 | 0.75 | 0.75 | 0.75 | 0.75 | 0.75 | 0.75 |
| Water | 60.75 | 60.75 | 60.75 | 60.75 | 60.75 | 60.75 | 60.75 | 60.75 |
| Total | 100.00 | 100.00 | 100.00 | 100.00 | 100.00 | 100.00 | 100.00 | 100.00 |
| Emulsion Properties | | | | | | | | |
| pH | 10.97 | 11.01 | 10.95 | 11.02 | 11.01 | 10.92 | 10.96 | 10.99 |
| Solids | 32.53 | 38.7 | 33.63 | 41.06 | 38.28 | 33.82 | 34.69 | 38.42 |
| Viscosity Cps | 3.1 | 5.7 | 2.8 | 9.8 | 13.3 | 3.2 | 4.7 | 7.8 |
| Results of Gypsum Formulations | | | | | | | | |
| Patty diameter (inches) | — | — | — | — | — | — | — | — |
| Water Absorption | — | — | — | — | — | — | — | — |

[1]All component and solid values are % by wt.
[2]DISAL ™ is a polynaphthalenesulfonic acid dispersant available from Handy Chemical, Montreal, Quebec, Canada.
[3]POLYFON ™ H is a lignosulfonate dispersant available from MeadWestvaco Corporation, Stamford, Connecticut As shown above, only selected paraffin waxes, the recited paraffin waxes with desired properties with examples shown in Table 3-2, would produce wax emulsions suitable for forming gypsum formulations suitable for industrial use. The other emulsion, which have a paraffin wax with at least one physical property outside of the recited paraffin wax property description, failed to produce suitable wax emulsion and gypsum formulations as shown in Tables 4 and 5. The emulsions 1-8 shown in Table 5 each had a mixture that thickened too much to pour a patty for testing when mixed with gypsum, and the data is represented as "--" for no result. The gypsum formulation products for emulsions 1-8 in Table 5 also could not be tested for water absorption as no patties could be formed as detailed above, and thus, the data is represented as "--" for no result.

In a further example, additionally tests were performed for the saponifiable wax substitutes for montan wax as described herein for Table 3-1 wax emulsions, and the results are presented in the following Table 6-1. Nippon Serio 145 for the table below may also be referred to as Luxco G-Wax, which is commercially available from Luxco of Richmond, Calif.

TABLE 6-1[1]

| Component | 1 | 2 | 3 | 4 |
|---|---|---|---|---|
| Nippon Serio 145 | 33.5 | 33.5 | 33.5 | 33.5 |
| German Montan | 33.5 | — | — | — |
| British Montan 2432 | — | 33.5 | — | — |
| British Montan 2437 | — | — | 33.5 | — |
| British Montan 2438 | — | — | — | 33.5 |
| MgSO$_4$ | 0.5 | 0.5 | 0.5 | 0.5 |
| DISAL[2] | 0.55 | 0.55 | 0.55 | 0.55 |
| Polyfon H[3] | 0.5 | 0.5 | 0.5 | 0.5 |
| Durasar[4] | 0.6 | 0.6 | 0.6 | 0.6 |

TABLE 6-1[1]-continued

| Component | 1 | 2 | 3 | 4 |
|---|---|---|---|---|
| 45% aq. KOH | 0.65 | 0.65 | 0.65 | 0.65 |
| Water | 60.2 | 60.2 | 60.2 | 60.2 |
| Total | 100.00 | 100.00 | 100.00 | 100.00 |
| Emulsion Properties | | | | |
| pH | — | 10.33 | 10.26 | 10.33 |
| Solids | — | 38.59 | 38.46 | 38.36 |
| Viscosity cps | — | 8.3 | 7.1 | 9.6 |
| Results of Gypsum Formulations | | | | |
| Patty diameter (inches) | — | 2.7 | 3.39 | 3.4 |
| Water Absorption | — | 1.06 | 2.09 | 0.78 |

[1]All component and solid values are % by wt.
[2]DISAL ™ is a polynaphthalenesulfonic acid dispersant available from Handy Chemical, Montreal, Quebec, Canada.
[3]POLYFON ™ H is a lignosulfonate dispersant availabe from MeadWestvaco Corporation, Stamford, Connecticut
[4]Durasar is a polynaphthalene sulfonate calcuim salt surfactant available from Handy Chemical, Montreal, Quebec, Canada.

The mixing amounts for the gypsum formulations of the above emulsions are shown in Table 6-2 below.

TABLE 6-2

| Stucco (grams) | Water Amount (grams) | Emulsion Amount(grams) | Emulsion |
|---|---|---|---|
| 50 | 35 | 0 | 1 (Control) |
| 50 | 32.6 | 3.9 | 2 |
| 50 | 32.6 | 3.9 | 3 |
| 50 | 32.6 | 3.9 | 4 |

Table 6-1 and 6-2 show that the saponifiable wax substitutes for montan wax provide effective patty formulation as compared to montan wax alone.

While the present invention has been described and illustrated by reference to particular embodiments and examples, those of ordinary skill in the art will appreciate that the invention lends itself to variations not necessarily illustrated herein. For this reason, then, reference should be made solely to the appended claims for purposes of determining the true scope of the present invention.

What is claimed is:

1. An emulsion for providing water-resistance to a gypsum product, comprising:
   at least one paraffin wax, wherein each paraffin wax of the at least one paraffin wax, comprises a melting point from about 57° C. and about 66° C., an oil content from about 0.1% to less than 1% by weight of the paraffin wax, a flash point from about 200° C. to about 240° C., and an average carbon number of the paraffin from 29 to 32;
   a hydrophilic metallic salt selected from the group consisting of magnesium sulfate, potassium sulfate, lithium sulfate, ammonium sulfate, potassium acetate, ammonium heptamolybdate, and combinations thereof; and
   water, wherein the emulsion is free of an alkyl phenol.

2. The emulsion of claim 1, further comprising one or more components selected from the group consisting of a saponifiable wax, an ionic dispersant, an alkali metal hydroxide, and combinations thereof.

3. The emulsion of claim 2, wherein the saponifiable wax comprises a wax selected from the group consisting of montan wax, carnauba wax, beeswax, bayberry-myrtle wax, candelilla wax, caranday wax, castor bean wax, esparto grass wax, Japan wax, ouricury wax, retamo-ceri mimibi wax, shellac, spermaceti wax, sugar cane wax, wool-lanolin wax, and combinations thereof.

4. The emulsion of claim 2, wherein the at least one paraffin wax is in an amount of about 25% to about 40% by weight based on the total weight of the emulsion, and wherein the emulsion further comprises a saponifiable wax in an amount of about 2.5% to about 4.5% by weight, based on the total weight of the emulsion.

5. The emulsion of claim 1, wherein the hydrophilic metallic salt is present in an amount of about 0.05% to about 5% by weight, based on the total weight of the emulsion.

6. The emulsion of claim 1, wherein the hydrophilic metallic salt comprises magnesium sulfate.

7. The emulsion of claim 2, wherein the ionic disperser is selected from the group consisting of a polynaphthalenesulfonic acid or salt compound, a lignosulfonate compound, and combinations thereof, and the disperser comprises from about 0.25% to about 5.0% by weight based on the total weight of the emulsion.

8. The emulsion of claim 2, wherein the alkali metal hydroxide comprises from about 0.5% to about 1.5% by weight, based on the total weight of the emulsion.

9. The emulsion of claim 1, wherein the emulsion comprises a solids content of at least 30% by weight, based on the total weight of the emulsion.

10. The emulsion of claim 1, wherein the emulsion comprises a solids content of greater than 45% by weight, based on the total weight of the emulsion.

11. The emulsion of claim 1, further comprising a biocide.

12. The emulsion of claim 11, wherein the biocide comprises a heterocycle compound containing nitrogen and sulfur.

13. The emulsion of claim 12, wherein the heterocycle compound comprises thiabendazole (2-(4-thiazolyl)-1H-benzimidazole).

14. A method for making an emulsion according to claim 1, comprising the steps of
    providing a first mixture comprising at least one paraffin wax, wherein each paraffin wax of the at least one paraffin wax, comprises a melting point from about 57° C. and about 66° C., an oil content from about 0.1% to less than 1% by weight of the wax, a flash point from about 200° C. to about 240° C., and an average carbon number of the paraffin from 29 to 32;
    providing a second mixture comprising a hydrophilic metallic salt and water;
    combining the first mixture and the second mixture to form a resultant mixture; and
    homogenizing the resultant mixture, wherein the hydrophilic metallic salt selected from the group consisting of magnesium sulfate, potassium sulfate, lithium sulfate, ammonium sulfate, potassium acetate, ammonium heptamolybdate, and combinations thereof, and wherein the emulsion is free of an alkyl phenol.

15. The emulsion of claim 1, wherein the emulsion is free of a starch component.

* * * * *